United States Patent [19]

Gutsche

[11] 4,403,755

[45] Sep. 13, 1983

[54] METHOD AND APPARATUS FOR USE IN HARNESSING SOLAR ENERGY TO PROVIDE INITIAL ACCELERATION AND PROPULSION OF DEVICES

[76] Inventor: Gunter E. Gutsche, 5175 Rue Forget, Box 666, St. Louis de Terrebonne, Quebec, Canada, J0N 1N0

[21] Appl. No.: 121,493

[22] Filed: Feb. 14, 1980

[51] Int. Cl.³ .......................... F03G 7/02; B64B 1/24
[52] U.S. Cl. .................. 244/53 R; 60/641.8; 60/203.1; 416/DIG. 4; 126/438; 126/419; 244/30; 244/31; 244/62; 244/DIG. 1
[58] Field of Search ................. 244/2, 15, 207, 53 R, 244/208, 29, 173, 31, 30, 168, 62, 93, 73, DIG. 1, 74; 416/146 R, DIG. 4, 85, 86, 20 R, 21, 90, 91; 60/203, 270 R, 641; 126/419, 440, 438, 439; 415/DIG. 8

[56] References Cited

U.S. PATENT DOCUMENTS

| | | | |
|---|---|---|---|
| 1,853,233 | 4/1932 | Schwarz | 244/93 |
| 2,396,911 | 3/1946 | Anxionnaz et al. | 244/73 R |
| 2,404,954 | 7/1946 | Godsey, Jr. | 244/73 R |
| 2,427,972 | 9/1947 | Melchior | 244/208 |
| 2,430,431 | 11/1947 | Lanier | 244/73 R |
| 2,484,127 | 10/1949 | Stelzer | 126/419 |
| 2,506,755 | 5/1950 | Watson | 244/33 |
| 2,821,351 | 1/1958 | Utgoff | 244/208 |
| 2,841,344 | 7/1958 | Stroukoff | 244/208 |
| 2,998,005 | 8/1961 | Johnston | 126/419 |
| 3,031,852 | 5/1962 | White | 60/241 AC |
| 3,089,670 | 5/1963 | Johnson | 244/62 |
| 3,103,330 | 9/1963 | Nelson et al. | 244/93 |
| 3,152,777 | 10/1964 | McLean | 244/30 |
| 3,153,878 | 10/1964 | Smith, Jr. | 244/31 |
| 3,206,925 | 9/1965 | Schiff | 60/203 |
| 3,861,379 | 1/1975 | Anderson, Jr. | 126/438 |
| 3,944,169 | 3/1976 | Bede | 244/16 |
| 4,085,667 | 4/1978 | Christianson | 60/641 AG |
| 4,106,480 | 8/1978 | Lyon et al. | 126/438 |
| 4,174,082 | 11/1979 | Eshou | 244/31 |
| 4,211,212 | 7/1980 | Braun | 126/440 |
| 4,261,534 | 4/1981 | Roselli | 244/31 |

FOREIGN PATENT DOCUMENTS

| | | | |
|---|---|---|---|
| 2363711 | 3/1978 | France | 60/641 AC |
| 20794 | of 1906 | United Kingdom | 415/DIG. 8 |

*Primary Examiner*—Galen L. Barefoot
*Attorney, Agent, or Firm*—Alan Swabey; Robert Mitchell; Guy Houle

[57] ABSTRACT

The present invention relates to a method of providing thrust and added lift to a vehicle by accelerating fluid heated by solar energy. The present invention also relates to apparatus for carrying out the aforementioned method. Accordingly, the present invention relates to a method of providing initial acceleration and propulsion or enhancing the initial acceleration and propulsion of a vehicle in an environment having at least some fluid, the vehicle being of the type having at least one member, at least a portion of which is treated for absorbing solar radiation for heating fluid adjacent the member for use in propelling the vehicle through the environment. By use of direct and/or focused solar radiation, fluid is heated, accelerated and deflected away from a vehicle by natural or forced convection to provide thrust and lift of the vehicle.

22 Claims, 14 Drawing Figures

METHOD AND APPARATUS FOR USE IN HARNESSING SOLAR ENERGY TO PROVIDE INITIAL ACCELERATION AND PROPULSION OF DEVICES

BACKGROUND OF THE INVENTION

1. Field of the Invention

The present invention relates to a method of providing thrust and added lift to a vehicle by accelerating fluid heated by solar energy. The present invention also relates to apparatus for carrying out the aforementioned method.

Accordingly, the present invention relates to a method of providing initial acceleration and propulsion or enhancing the initial acceleration and propulsion of a vehicle in an environment having at least some fluid, the vehicle being of the type having at least one member, at least a portion of which is treated for absorbing solar radiation for heating fluid adjacent the member for use in propelling the vehicle through the environment.

2. Description of the Prior Art

Various vehicles are known which utilize solar energy for propulsion of the same through an environment having at least some fluid. However, such vehicles lack the means for accelerating fluid heated by solar radiation so as to provide thrust and lift to the vehicle utilizing natural, mixed and/or forced convection. Accordingly, in one aspect, the vehicles of the prior art lack the capacity to accelerate from a standstill position utilizing solar energy as a prime mover. In a further aspect, the vehicles of the prior art lack the capacity to impel fluid to be heated by solar radiation and accordingly accelerate the heated fluid independent of the velocity of the vehicle whilst moving through the environment.

Turning now to specific examples in the prior art.

Johnson's U.S. Pat. No. 3,089,670 dated May 14, 1963 discloses a solar powdered vehicle utilizing the ram-jet principle and therefore will only function over a very narrow and critical supersonic speed range. It completely lacks capacity to accelerate from a standstill position utilizing solar energy as a power source. The efficiency of this patented device, being a high altitude airplane, relies on a flight path dictated by the position of the sun. This limits freedom of movement of the vehicle and accordingly its utility. This reference is directed away from that of the present invention which is concerned with vehicles having low energy requirements and accordingly low speeds.

Smith's U.S. Pat. No. 3,153,878 dated Oct. 27, 1964 discloses a lighter than air device powered by solar energy. It lacks means to accelerate the heated fluid by natural and mixed or forced convection so as to provide lift and thrust to the vehicle.

Bauserman's U.S. Pat. No. 3,337,162 dated Aug. 22, 1967 also discloses a lighter than air device being a solar powered hot air balloon. In this device, lift is provided merely by buoyancy resulting from solar heating of accumulated fluid. This is in contrast to the present invention which involves the use of free to move fluid for motivating the vehicle. Thus, no means is present in the patented device for accelerating fluid so as to provide thrust and lift to the vehicle. Furthermore, the treated member is not secured in a manner as per the present invention.

Other solar powered hot air ballons include ones disclosed in Blondin's U.S. Pat. No. 1,866,079 dated July 5, 1932; Watson's U.S. Pat. No. 2,506,755 dated May 9, 1950; Byron's U.S. Pat. No. 3,565,368 dated Feb. 23, 1971; and Ashman's et al U.S. Pat. No. 3,220,671 dated Nov. 30, 1965. All of these devices lack the features discussed in respect of Bauserman. Accordingly, like Bauserman, they have no means for accelerating heated fluid so as to provide thrust and lift to the vehicle.

Kyryluk's U.S. Pat. No. 3,137,125 dated June 16, 1964 discloses a solar motor and although the disclosed device is not a vehicle which is propelled from one location to another in an environment having at least some fluid, it is discussed here as an object upon which improvement could be obtained, by use of the present invention, thus providing an improved device.

Reference is made to a further prior art device namely Martin's radiometer as per U.S. Pat. No. 1,000,831 dated Aug. 15, 1911, which like the present invention, includes a treated surface for use in producing thrust by acceleration of molecules. However, the radiometer principle causes the treated surface to recede from the source of radiation whereas the present invention reverses the process and allows for the generation of lift and thrust toward the source of radiation.

A further prior art device which includes treated surfaces for absorbing or reflecting solar radiation is disclosed in Cutler's et al U.S. Pat. No. 3,057,579 dated Oct. 9, 1962. However, the purpose of the treated surfaces is not to produce heat for energizing fluid since such is not present in the environment in which the device operates. On the contrary, the purpose of the treated surfaces is to provide a varying degree of thrust from the solar wind.

SUMMARY OF THE INVENTION

It is therefore a principal object of the present invention to overcome the aforementioned disadvantages discussed in respect of the prior art vehicles and devices.

It is a further object of the present invention to provide a low cost energy source for powering a vehicle, particularly where there is a penalty for carrying fuel and fuel burning propulsion units as for example in high altitude and long range conditions.

It is a further object of the present invention to provide a simple light weight and inexpensive solar powered vehicle.

It is a further object of the present invention to provide improvement to existing aircraft which entails a minimum of structural and aerodynamic change but which results in improved performance, through the use of solar energy.

It is a further object of the present invention to provide improvement to vehicles which results in improved performance through the use of solar energy but which will not impair the performance of the vehicles when operated in their normal mode of operation.

It is a further object of the present invention to provide improvements to vehicles which results in improved performance thereto through the use of solar enery but which will not inhibit the use of the vehicle in its conventional mode, but enhance efficiency when solar radiation is available.

It is a further object of the present invention to provide an improved lift and drag ratio of a glider, particularly above cloud level where thermals are not available for soaring but where solar radiation is abundant and assured.

Numerous further objects will become apparent from the description hereinafter.

In one aspect of the present invention there is provided a method of providing initial acceleration and propulsion or enhancing the initial acceleration and propulsion of a vehicle in an environment having at least some fluid, said vehicle having at least one member, at least a portion of which is treated for absorbing solar radiation for heating fluid adjacent said member for use in propelling said vehicle through said environment, the improvement comprising the steps of: (a) exposing said treated portion to solar radiation and heating fluid adjacent said member thereby increasing the volume and pressure of said fluids; and (b) accelerating said heated fluid away from said member in a manner to provide thrust and lift to said vehicle and accordingly respectively providing or enhancing propulsion of the vehicle, said manner including natural, mixed and-/or forced convection of the fluid.

In a further aspect of the present invention there is provided a vehicle having at least one member for use in propelling the vehicle from one location to another in an environment having at least some fluid, said member having at least one portion thereof treated for absorbing solar radiation for heating fluid adjacent said member for use in propelling the vehicle, the improvement comprising: fluid accelerating means for accelerating said heated fluid away from said member to provide thrust and lift to said vehicle, said accelerating means being so arranged as to cause convection of said fluid and enhance propulsion of said vehicle from standstill to a selected speed.

In a further aspect of the present invention there is provided in a vehicle having at least one member for use as an airfoil, said airfoil having respective leading and trailing edges and said airfoil including a concave lower surface and convex upper surface, the improvement comprising: a treatment for absorbing solar radiation, applied to at least a selected one of said surfaces whereby when said airfoil is secured to said vehicle in a selected manner and upper absorption of solar energy by said treated surface, the fluid adjacent said airfoil is heated and expanded to thus react against said airfoil to thereby provide lift and/or thrust to said vehicle.

In a further aspect of the present invention there is provided in a vehicle having at least one member for use as an airfoil, said airfoil having respective leading and trailing edges and having at least one chamber having at least one upper and one lower skin, at least one of said skins being transparent so as to admit solar radiation therethrough onto said other skin, the improvement comprising: a treatment for absorbing solar radiation being applied to said other skin whereby when said airfoil is secured to said vehicle in a selected manner and upon absorption of solar energy by said treated skin, the fluid adjacent said skin is heated and expanded to react against said skin to thereby provide lift and/or thrust to said vehicle.

In a further aspect of the present invention there is provided in a vehicle having at least one member for use as an airfoil, said airfoil having respective leading and trailing edges, and at least one recess in a surface of said airfoil having at least one treated portion for absorbing solar radiation and at least one portion of said airfoil adjacent said treated portion being transparent for admitting solar radiation to said treated portion.

In a further aspect of the present invention there is provided in a vehicle having at least one member for use as an airfoil, said airfoil having respective leading and trailing edges and at least one chamber having at least one upper and one lower skin, at least one of said skins being transparent so as to admit solar radiation therethrough onto said other skin, the improvement comprising: providing at least one recess in at least one of said skins, said recess opening toward said trailing edge, a portion of said recess having solar radiation absorbing treatment therein, said recess for use in diverting fluid passing adjacent said skin, thereby to provide lift and thrust to said vehicle.

In a further aspect of the present invention there is provided in a vehicle having at least one member for use as an airfoil which includes at least a pair of skins, at least one of which is transparent, said skins defining a chamber and said airfoil having at least one slot formed by a slat or flap arranged on said airfoil, the improvement comprising: treating at least a portion of said slot with solar radiation absorbing material for heating fluid in and passing through said slot, for use in providing lift and/or thrust to said vehicle.

In a further aspect of the present invention there is provided a vehicle having at least one transparent skin, said vehicle including at least one member having at least one transparent skin and defining an enclosure, the improvement comprising: at least one selectively positionable reflector in said enclosure for use in focusing solar energy received through said transparent skin of said member, into at least one further portion of the vehicle having said transparent skin and directing onto a solar radiation absorbing portion for use in heating fluid, when solar radiation is applied to said absorbing portion, and acceleration means for accelerating said heated fluid for use in providing lift and thrust to the vehicle.

BRIEF DESCRIPTION OF THE DRAWINGS

The invention is illustrated by way of example in the accompanying drawings wherein.

DESCRIPTION OF PREFERRED EMBODIMENTS

Referring now in detail to the drawings.

Figure 1:
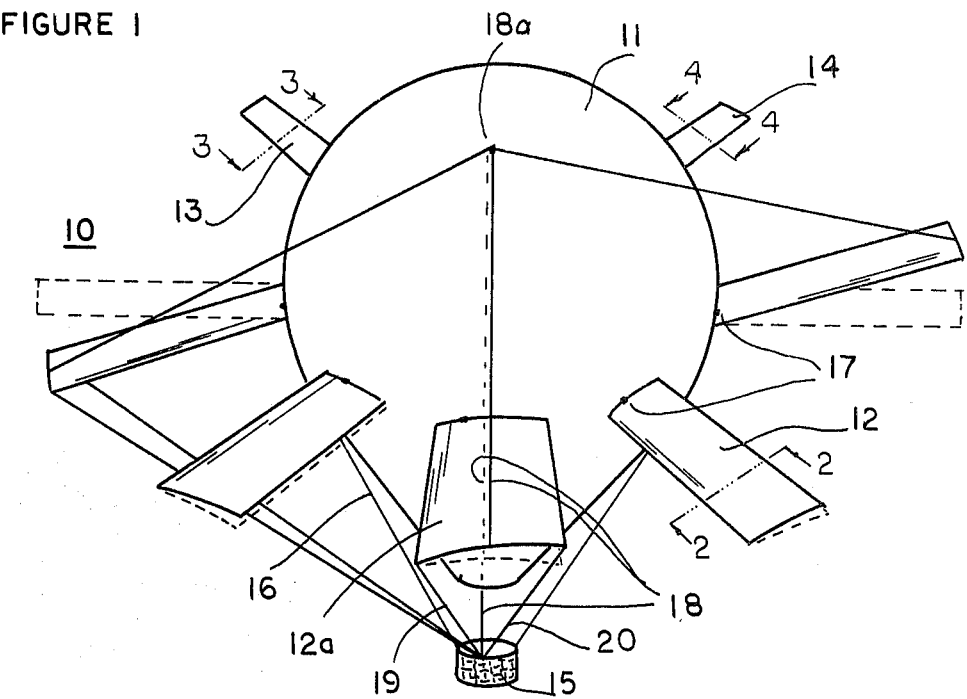
FIG. 1 is an oblique view of a lighter than air device in accordance with the present invention.

FIG. 1 illustrates diagrammatically a lighter than air device 10 namely a vehicle for use in an environment having at least some fluid, comprising a gas filled body 11 having a plurality of members 12 hingedly secured thereto and extending therefrom for use in motivating and controlling vehicle 10. Although the FIG. 1 embodiment discloses a plurality of members for example 12, 13 and 14, it will be realized from the description hereinafter, a single member may be utilized for present purposes. Vehicle 10 further includes a gondola 15 suspended beneath body 11 and secured thereto by means 16. FIG. 1 is a composite diagram in that members 13 and 14 are included for convenience of illustration. Members 13 and 14 may if desired, be substituted for member 12 as will be apparent from the description hereinafter. Members 13 and 14 are thus designs of members which may be utilized as alternatives to member 12 and other designs in accordance with the present invention not illustrated.

Gas filled body 11 may be constructed in accordance with well known methods and utilize well known suitable materials and include well known provisions for interconnecting members 12, 13 or 14, in addition to the type shown. Thus, detailed construction details in respect of body 11 will be dispensed with acknowledging those skilled in the art are well familiar with such construction. Body 11 contains fluid which for example may be helium or heated air.

Figure 2:
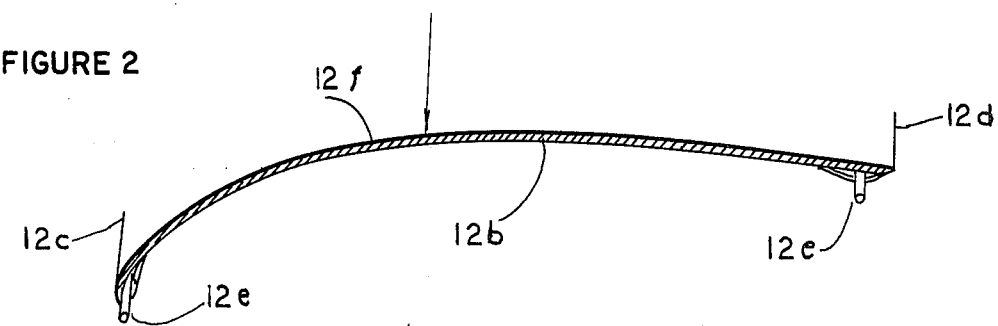
FIG. 2 is a sectional view taken along line 2—2 in FIG. 1 of a member in accordance with the present invention.

The construction details of member 12 are more clearly shown in FIG. 2. Thus, as seen member 12 comprises a sail type undercambered (having concave under and convex upper surfaces) airfoil, manufactured using reinforced aluminum foil 12b which is suitably stiffened with battes, so as to withstand stress imposed during operation of vehicle 10. As further seen in FIG. 2, member 12 comprises construction commonly used in single surface type hang gliders. Thus, the respective leading and trailing edges 12c and 12d of members 12 are supported upon a wire braced tube skeleton 12e part of which is illustrated in FIG. 2. Member 12 further includes a surface 12f treated for absorbing solar radiation for heating fluid adjacent member 12. Such treated surface may be provided by any suitable means including well known commercially available products, being applied directly to foil 12b. One suitable example of such product is available under the trade name "MAX-ORB SOLAR FOIL" (Trademark of Ergenics Corp. New Jersey, U.S.A.). The treatment provided by this particular product results in a selective surface maximizing absorption of solar energy and minimizing re-radiation of heat. It is to be noted surface 12f may or may not be fully covered by the aforementioned solar foil. Alternatively, though less efficient, the treated surface 12f may be simply coated with black paint. The present member construction affords a shiny underside surface which minimizes downward radiation heat losses.

Member 12 is hingedly secured to body 11 via a universal joint type hinge 17 as seen in FIG. 1, thus permitting movement of member 12 relative to body 11 as for example shown by phantom line in FIG. 1. Although not shown, all members 12, 13 and 14 are hingedly secured to body 11. Universal joint hinge 17 thus permits members 12, 13 and 14 to be selectively positioned by control means, discussed hereinafter, relative to body 11 thereby adjusting the pitch and elevation of member 12. The aforementioned control may be by any suitable means including that shown namely by cables 18, 19 and 20 operated and controlled from gondola 15. Cables 18, 19 and 20 may be arranged in any suitable well known manner for example as shown utilizing a pulley system for accomplishing the desired and described control of member 12 and accordingly control of vehicle 10 during operation. As seen in FIG. 1, cable 18 is secured adjacent the free end of member 12a and extends upwardly passing through a pulley system 18a to extend downwardly to gondola 15. Cables 19 and 20 are likewise secured adjacent the free end of member 12a and extend directly downwardly to gondola 15.

Figure 3:
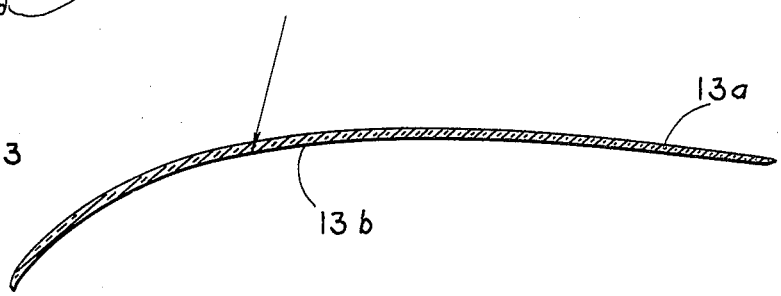
FIG. 3 is a sectional view taken along line 3—3 in FIG. 1 of a further member in accordance with the present invention.

Referring to FIG. 3, member 13 is similar to member 12 except for the material used in construction of sail 13a. Sail 13a is constructed of transparent material such as "MYLAR" (Registered Trademark of Dupont) polyester film, the underside surface 13b of which is treated for absorbing solar radiation in the manner discussed above.

Figure 4:
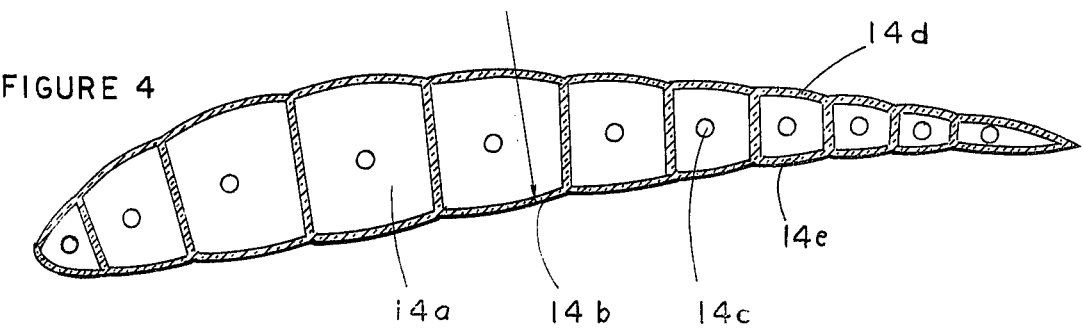
FIG. 4 is a sectional view taken along line 4—4 in FIG. 1 of an inflatable airfoil in accordance with the present invention.

Attention is now drawn to FIG. 4 showing construction details of member 14, which is basically a well known inflatable type airfoil having a plurality of chambers 14a therein which may be filled with the same medium present in body 11. Further, in this embodiment, member 14 is constructed entirely of flexible transparent material and as similar to the FIG. 3 embodiment, the underside surface 14b is treated for absorbing solar radiation. Apertures 14c are provided so that chambers 14a communicate with the gas filled body 11. Alternatively, aperture 14c may be eliminated and member 14 inflated independently of body 11.

Referring to FIG. 1, it will be seen members 12, 13 and 14 extend outwardly from body 11, such are illustrated having a high aspect ratio, which is a function of the span and the cord of the member. It is acknowledged that under certain conditions, it may be desirable to maximize the area of members 12, 13 and 14 and accordingly provide a different aspect ratio. Members 12, 13 and 14 may be secured to body 11 in any selected manner in order to obtain specific advantages of operation. In reference to FIG. 1 and in order to minimize instability during propulsion, the treated members are arranged to be near the center of pressure of the vehicle. As a further modification to the embodiments of FIGS. 3 and 4, the lower outer surfaces of members 13 and 14 could be covered with aluminum foil in order to minimize the radiation of infra-red radiation downwardly from the treated surface.

Gondola 15 may be of any suitable well known type including the well known basket type illustrated diagrammatically in FIG. 1. Alternatively, it may be adapted to accommodate remote control equipment for operation of vehicle 10. As indicated previously, gondola 15 is secured to body 11 by means 16 comprising ropes.

The operation of vehicle 10 will now be described. Vehicle 10 attains sustention in the same manner as conventional lighter than air devices and upon exposure of the treated surface or surfaces to solar radiation, they become heated and subsequently heat the fluid adjacent the members. In the case of member 12, the solar radiation first strikes the treated surface and heats the same, the generated heat passes through the aluminum foil, which is a good conductor of heat, therefore heats the fluid adjacent the member. In the case of member 13, solar radiation penetrates the transparent material and heats the treated lower surface and in turn the fluid adjacent the member. In the case of member 14 solar radiation indicated throughout the drawings, by an arrow first penetrates upper skin 14d and subsequently lower skin 14e and thereafter heats the treated outer surface 14b to heat the fluid adjacent the same.

The fluid heated by said treated surfaces expands and therefore has a tendency to rise and in doing so exerts a lifting force on the member and accordingly the vehicle. The members are then adjusted in position relative to vehicle 10 by controls 19 and 20 to assume a selected pitch position with respect to the horizontal. This causes the buoyant fluid to be deflected in a selected direction thus providing thrust on the member and accordingly the vehicle, natural convection accelerating the fluid away from the member. Further control of operation of vehicle 10 is attained by movement of selected ones of members 12, 13 and 14, effected by operation of control cable 10 accordingly raising or lowering the free end of the respective members. This creates an inclination of the member to the horizontal, allowing natural convection to occur in a span-wise direction. Through manipulation of the various controls, it will be realized the various members 12, 13 and 14 may be arranged whereby members on opposite sides of vehicle 10 are in adjusted pitch position and members in respective fore and aft positions are in respective raised and lowered position, thus providing a unified deflection of heated fluid to provide linear thrust. Conversely, selected adjustment of controls 18, 19 and 20 will provide rotation of vehicle 10 within its environment or even a braking action for the vehicle as in the case prior to landing.

Figure 5:
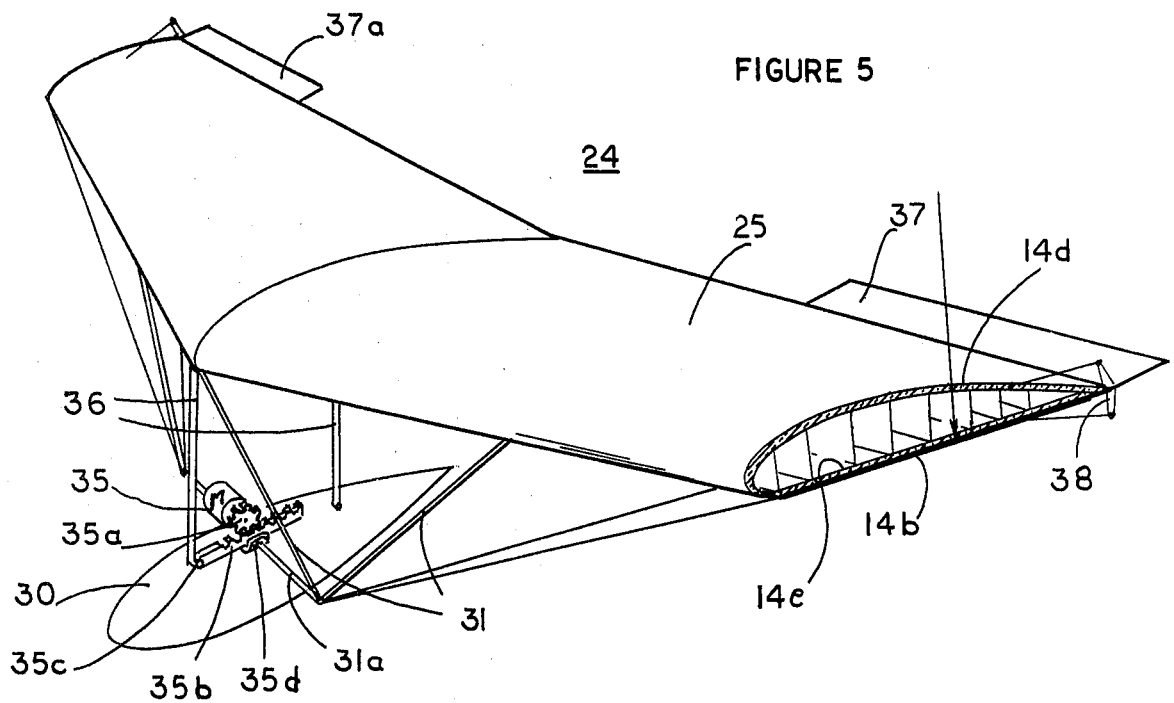
FIG. 5 is an oblique view of a lighter than air vehicle in accordance with the present invention.

Referring now to FIG. 5, there is disclosed, as mentioned previously, a lighter than air vehicle 24 having a wing 25 inflated with a lighter than air medium and a nacelle 30 suspendedly secured therefrom and arranged so as to be selectively movable with respect to wing 25 via a suitable control unit referred to hereinafter.

In the embodiment shown in FIG. 5, a plurality of rigid rods 31 are rigidly secured to wing 25 and suspended therefrom to form a pair of triangular configurations which are interconnected by a member 31a upon which is rigidly secured motor means 35 having a pinion 35a, controlled by suitable means not shown. As seen in FIG. 1, nacelle 30 is suspended from wing 25 via a pair of rigid rods 36 pivotally interconnected to both wing 25 and nacelle 30. A rack 35b is pivotally secured at one end thereof to nacelle 30 via pivot 35c and is retained in constant meshing engagement with pinion 35a by a guide 35d attached to member 31a. Thus, as will be seen, nacelle 30 swings about wing 25 in a horizontal plane controlled in its swinging movement by selected operation of motor means 35.

Wing 25 may be of any suitable design including as for example that disclosed in FIG. 4. Wing 25 further includes, adjacent its trailing edge, elevons 37 and 37a for use in controlling yaw and pitch, thus constituting aerodynamic controls of vehicle 24. Elevons 37 are controlled from nacelle 30 by well known means 38 which include well known control horns, cables and pulleys, part of which are shown.

Nacelle 30 comprises an aerodynamic enclosure of well known design. A detailed description of nacelle 30 has been omitted, it being deemed unnecessary since the construction details are well known to those skilled in the art.

Referring now to the operation of the embodiment disclosed in FIG. 5, having wing 25 for example in accordance with that of FIG. 4. Solar radiation penetrates the upper skin 14d and lower skin 14e to heat treated outer surface 14b (which if desired, may be further covered with heat conducting polished materials such as aluminum foil). Fluid adjacent outer surface 14b is thus heated and exerts an upward force upon wing 25. Through manipulation of controls (not shown) to activate motor means 35, nacelle 30 is moved relative to wing 25 so as to selectively shift the center of gravity of vehicle 24 forward of its center of pressure, thereby creating or maintaining an inclination to the horizontal of wing 25 that will induce the heated fluid to accelerate away from wing 25 and thereupon to provide thrust to vehicle 24. Due to the aforementioned inclination, the direction of flow of the heated fluid will be toward the trailing edge of wing 25. Such thrust can be reversed by selectively shifting the center of gravity of vehicle 24 rearwardly of its center of pressure.

Once a selected velocity of vehicle 24 has been attained, elevons 37 and 37a can be activated in unison to provide pitch control of wing 25 thereby regulating flow of the heated and accelerated fluid. Independent activation of elevons 37 and 37a will provide roll control. This embodiment of the invention provides the advantage of having a large horizontal surface to heat a large volume of fluid and thus provide substantial thrust. Wing 25 being a lighter than air type device allows the angle of attack to be changed without adversely effecting the lift of wing 25.

Further thrust can be obtained by wing 25 during ascent due to buoyancy, such resulting from rearward deflection of fluid from the inclined upper surface of wing 25. Likewise, further thrust will result during descent, for similar reasons.

Figure 6:
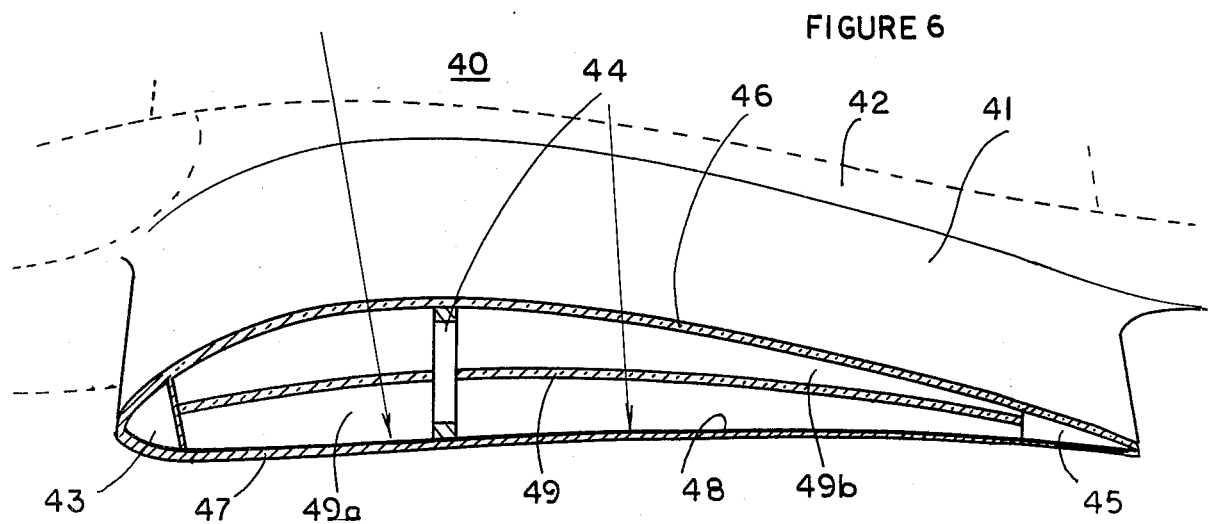
FIG. 6 is a sectioned oblique view of an airplane wing secured to an aircraft, the wing being modified in accordance with the present invention including having a pair of dead air chambers.

Referring now to the embodiment of FIG. 6, there is illustrated, in part, an airplane 40 having a wing member 41 being an airfoil, having respective leading and trailing edges, and secured to fuselage 42 which may be of any suitable type. Member 41 comprises frame work of known conventional design thus it is deemed unnecessary to describe construction details familiar to those skilled in the art. Member 41 features a torsion box 43 in its leading edge and a main spar 44, also a trailing edge member 45 and rib members (not shown).

Member 41 further includes an upper transparent skin 46 comprising MYLAR FILM (Trademark of Dupont) or LEXAN SHEETING (Trademark of General Electric), or any other suitable material. The bottom skin 47 comprises aluminum sheeting of aircraft quality and of appropriate gauge thickness. Portions of the top surface 48 of bottom skin 47 are treated with the aforementioned solar radiation absorbing material. A transparent skin 49 is secured intermediate upper skin 46 and bottom skin 47. Skin 49 comprises suitable material for blocking heat radiation emmitting from heated surface 48. Such suitable material may be for example, HEAT MIRROR (Trademark of Southwall Corp. of California), which is light weight transparent film. Transparent skin 49 thus creates a pair of dead air chambers 49a and 49b. Due to the heat radiation blocking properties of skin 49 and the created dead air chambers 49a and 49b, radiation heat losses and convection heat losses to upper skin 46 are kept to a minimum to maximize heating of the fluid adjacent bottom skin 47.

Regarding the operation of the embodiment FIG. 6, solar radiation penetrates upper skin 46 intermediate skin 49 and heats treated portion 48. The heat produced is conducted through bottom skin 47 to heat the fluid adjacent the same. As a result, the fluid is expanded and accelerated away from bottom skin 47, exerting a lift and thurst force on wing member 41.

Figure 7:
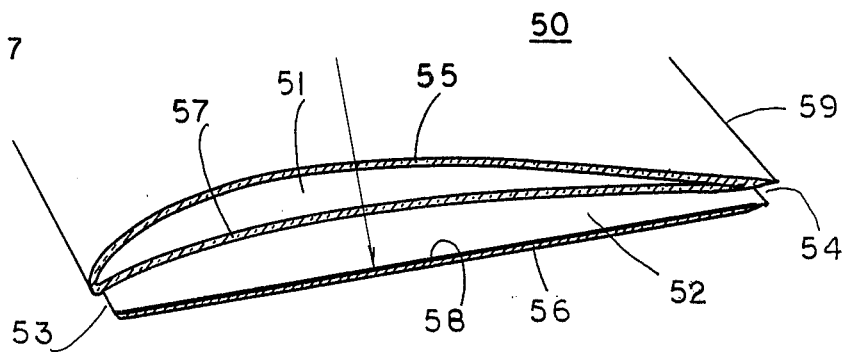
FIG. 7 is a sectioned oblique view of a further chambered member having respective apertures adjacent the leading and trailing edges thereof for passage through one of the chambers.

Referring to FIG. 7, there is illustrated a further embodiment of an airfoil somewhat similar to that shown in FIG. 6. Thus, FIG. 7 illustrates a wing member 50 constructed similarly to the embodiment of FIG. 6 having one dead air chamber 51, a passageway-chamber 52 provided with apertures 53 and 54 located respectively in the leading and trailing edges of member 50. The upper skin 55, lower skin 56 and intermediate skin 57 comprise similar material to that of the embodiment of FIG. 6 including the treated surface 58. As noted, chamber-passageway 52 diminishes progressively in volume toward the respective apertures 53 and 54.

Regarding operation of the embodiment of FIG. 7, solar radiation penetrates upper skin 55, intermediate skin 57 and heats treated surface portion 58. The heat produced is conducted through bottom skin 56. Fluid adjacent the upper and lower surfaces of skin 56 is heated and expanded. In the case where wing member 50 is selectively inclined with respect to the horizontal, natural convection occurs within chamber-passageway 52 and below bottom skin 56, thus accelerating the heated fluid toward the trailing edge 59 of wing member 50, said acceleration being enhanced by the ventury effect generated by the shape of aperture 54.

In the case where wing 50 is mounted on a vehicle which includes other propulsion means, the heat is transferred from bottom skin 56 to fluid by forced convection and the fluid expanded and accelerated toward trailing edge 59.

Figure 8:
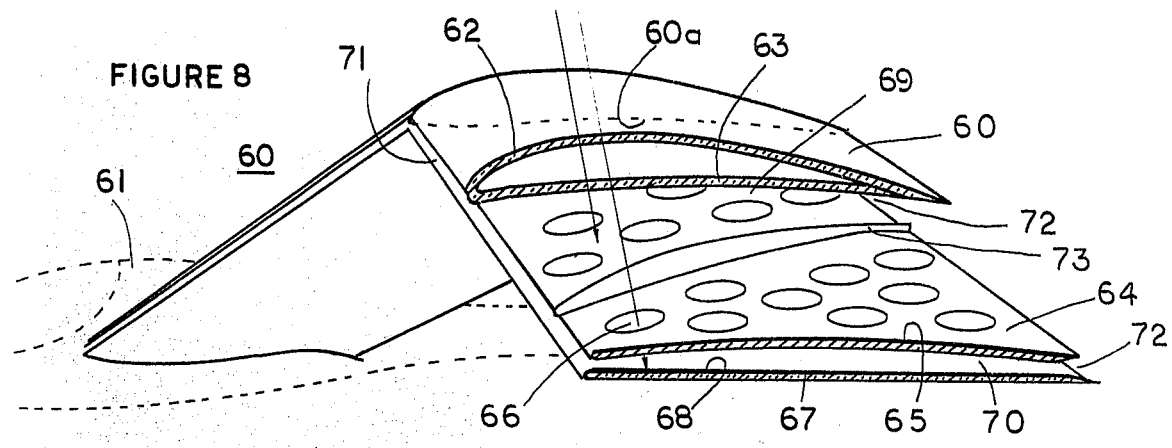
FIG. 8 is a sectioned oblique view of a triple chambered airfoil in accordance with the present invention including anhedral and dihedral characteristics.

Referring now to the embodiment of FIG. 8, there is disclosed a wing member 60 mounted upon fuselage 61 which again, like the previously described embodiments, is structurally in accordance with known designs using conventional known materials. However, wing member 60 is of the gull wing design providing an anhedral and dihedral configuration. As in the embodiment of FIG. 7, two upper skins respectively 62 and 63 are provided and the embodiment includes a third skin 64 constructed from aircraft type aluminum sheeting of appropriate thickness and in part, treated on its upper surface 65 with the aforementioned solar radiation absorbing material. Skin 64 includes apertures 66 permitting solar radiation to penetrate to the bottom skin 67 which may be constructed from a plastic laminate having good heat insulating qualities. Upper surface 68 of skin 67 is also treated with aforementioned solar radiation absorbing material. Skins 63, 64 and 67 provide a pair of chamber-passageways 69 and 70 having aperture 71 adjacent the leading edge of wing member 60 and aperture 72 adjacent the trailing edge thereof. Apertures 71 and 72 may if desired, and as shown, extend substantially along respectively the total leading and trailing edges of wing member 60. Fluid guiding vanes 73 are secured within chambers 69 and 70 for use in directing the heated fluid.

In an alternative embodiment, skin 64 may comprise a non-apertured transparent material, the underside of which is partially treated to absorb solar radiation. The solar radiation not intercepted by skin 64 will pass through onto treated upper surface 68.

Referring again to the embodiment of FIG. 8 and more particularly to elongated aperture 72 in the trailing edge of wing member 60, it is important to note that this aperture is located on the underside of wing member 60. The purpose of this is to permit the fluid heated by solar radiation to move in a direction toward apex 60a of the gull wing and accordingly away from the tip of wing member 60 (not shown). Thus, there is generated a fluid flow that will reduce the tendency of the fluid to move toward the wing tip and into the wing vortice. It will be readily realized that in the dihedral portion, aperture 72 will be located on the upper surface of wing 60 in order to achieve the aforementioned effect. Therefore, by providing a configuration as disclosed in FIG. 8 including passageway aperture 72 and fluid guiding vane 73 in the manner disclosed, the vortex sheet is influenced to minimize induced drag during flight and together with the provided anhedral and dihedral configuration, the heated fluid is deflected in a direction opposite to the direction of travel of the vehicle.

Figure 9:
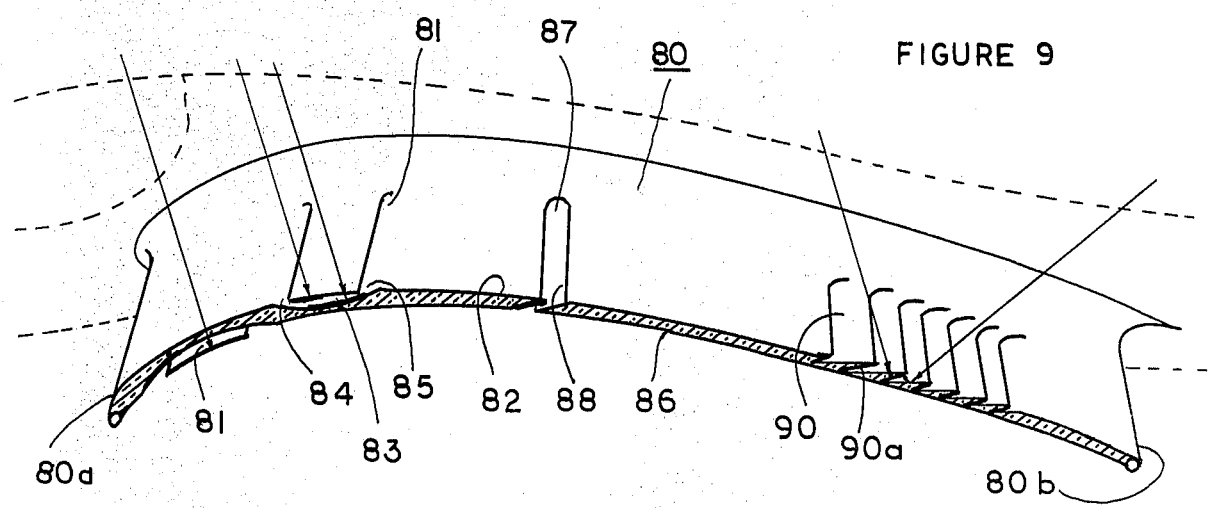
FIG. 9 is a sectioned oblique view of a further member in accordance with the present invention having a particular skin construction, including passageways therein.

Referring now to the embodiment of FIG. 9, there is disclosed a completely transparent member 80 being an airfoil having respective leading and trailing edges 80a and 80b and having a recess 81 in the upper surface 82 of member 80. Recess 81 comprises a passageway 83 having an inlet 84 and an outlet 85. Passageway 83 further includes an upper and lower surface adjacent outlet 85 which is treated with solar radiation absorbing material. Upon solar radiation striking the latter mentioned treated surfaces, fluid in passageway 83 is heated and accelerated through outlet 85 resulting in fluid from the boundary layer being impelled in the passageway 83 for subsequent heating and acceleration through outlet 85, thereby energizing the boundary layer.

Wing member 80 further includes recess 81 located on the lower surface 86. Accordingly, this recess is identical to recess 81 located in upper surface 82.

Wing member 80 further includes an elongated passageway 87 extending therethrough and this connects between upper surface 82 and lower surface 86. Passageway 87 is treated with solar radiation absorbing material adjacent its outlet 88 in similar fashion to that of passageway 83.

Wing member 80 further includes adjacent the trailing edge thereof a plurality of recesses 90 in upper surface 82. Recess 90 represents a serrated surface having a series of commonly inclined peaks. Such may be produced by providing a series of folds in upper surface 82. Recesses 90 are treated with solar radiation absorbing material on their upper surfaces 90a. If desired, the surface of recess 90 located opposite to treated surface 90a may include reflective characteristics to enhance absorption of solar radiation by the treated surface This is particularly useful when the solar source is not directly opposite the treated surface. Upon solar radiation striking treated surface 90a directly or indirectly, fluid in recess 90 is heated and accelerated away from the treated surface providing a degree of lift to member 80, and by natural convection, moves toward trailing edge 80b. During motion of the vehicle, fluid in recess 90 is replenished by the turbulent boundary layer. Recess 90 opens toward the trailing edge of member 80 so that molecular motion of the heated fluid will be substantially directed toward the trailing edge and produce thrust on member 80.

Figure 10:
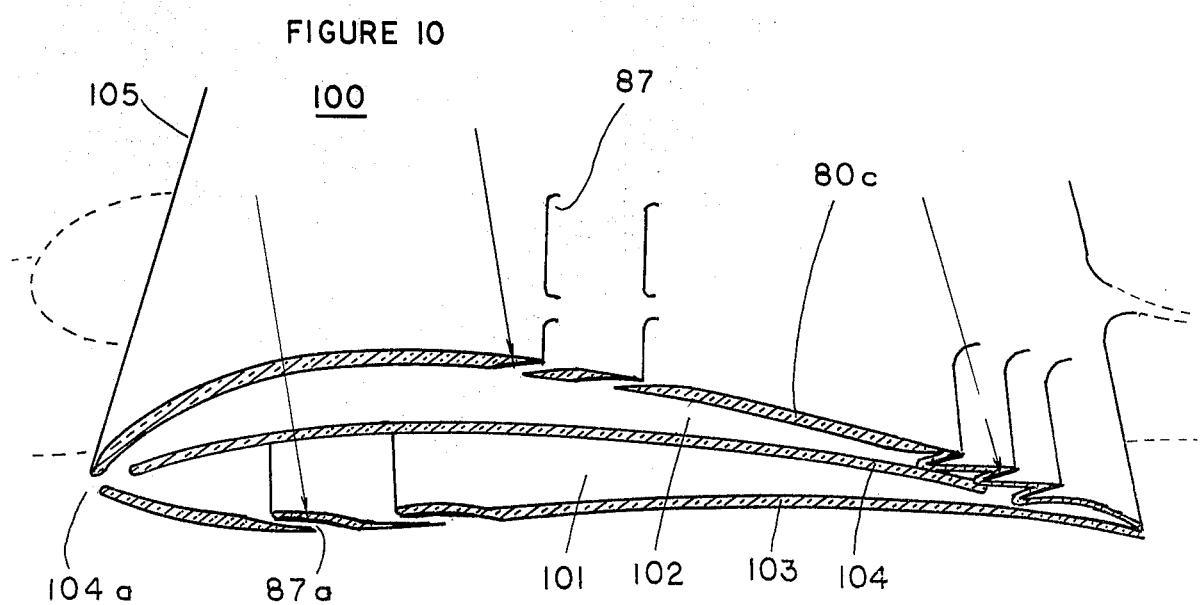
FIG. 10 is a view of a member similar to that shown in FIG. 9 but having a pair of chambers.

Referring now to FIG. 10, there is disclosed a further embodiment of the invention having a wing 100 being similar to that disclosed in FIG. 9 with respect to its upper surface and having a transparent lower skin 103. A pair of chambers 101 and 102 are divided by a transparent intermediate skin 104. An elongated aperture 104a is provided adjacent leading edge 105. Thus, chambers 101 and 102 represent a pair of passageways whereby fluid may enter via aperture 104a and exit through for example respective passageways 87 in upper skin 80c and 87a in lower skin 103.

The embodiment disclosed in FIG. 10 functions in similar manner to that described in respect of the embodiment of FIG. 9 except there is no equalization of fluid pressure on respective upper and lower surfaces of wing 100 as is provided by passageway 87 in respect of member 80.

It will be readily appreciated that the specific features shown in the embodiments disclosed in FIGS. 9 and 10 may be interchanged one with another, as is true of the various other embodiments disclosed and described throughout the disclosure, in order to achieve certain desired effects affecting the behavior and/or control of a vehicle fitted with such airfoils.

Figure 11:
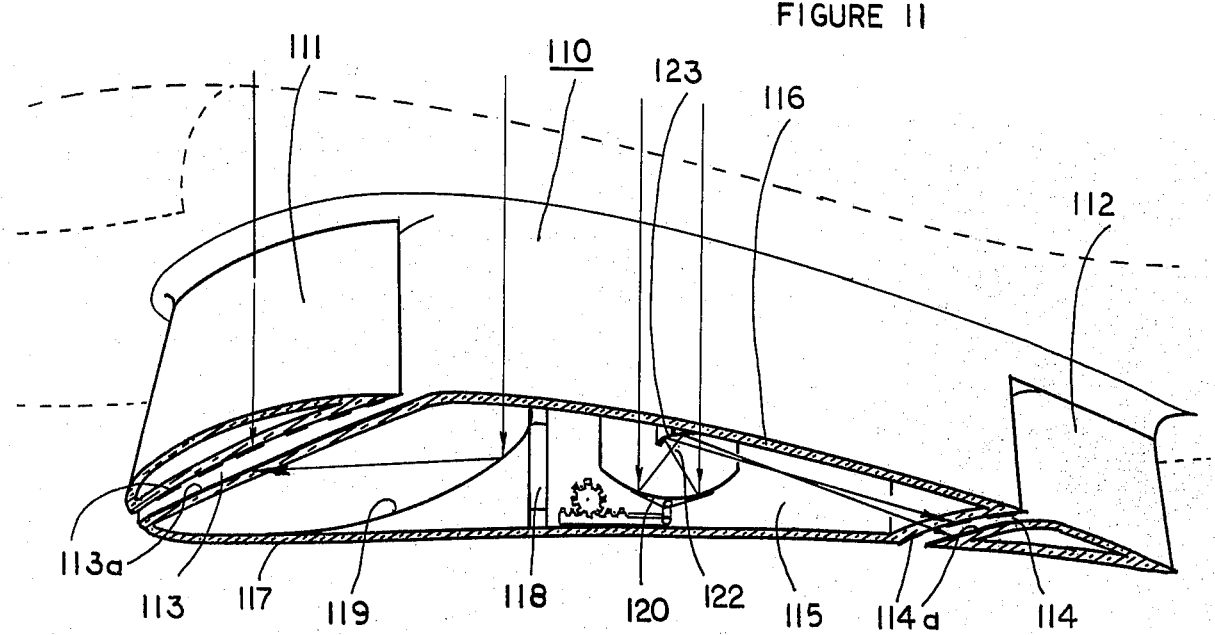
FIG. 11 is a part sectional view of an airfoil in accordance with the present invention including slots and slats therein.

Referring to FIG. 11 there is illustrated yet a further embodiment of an airfoil 110 of well known aerodynamic design having at least a transparent slat 111 and a flap 112 forming respective slots 113 and 114. Airfoil 110 comprises a chamber 115 formed by transparent upper skin 116 and lower skin 117 secured in spaced relation by assistance of spar 118. Slots 113 and 114 include respective treated surfaces 113a and 114a for absorbing solar radiation for use in heating fluid within slots 113 and 114. Chamber 115 also comprises a reflector 119 fixedly secured therein and a movably mounted parabolic reflector 120, both reflectors being for use in directing solar radiation onto respective treated surfaces 113a and 114a. Reflector 119 is, apart from being parabolic, is elongated in shape and adapted respectively to receive and transmit solar radiation onto treated surface 113a when the solar source is not favorably positioned to strike directly the treated surface 113a.

Reflector 120 is also elongated and parabolic in shape and is movably mounted and through suitable controls (not shown) is selectively positioned to receive and transmit solar radiation through focal point 122 onto reflector 123, which relays the solar radiation onto treated surface 114a. An example of movably mounting reflector 120, is shown in FIG. 11 and employs a rack and pinion arrangement, operational details of which will become apparent from the description hereinafter in respect of FIG. 13.

In operation, solar radiation is absorbed by treated surface 113a and 114a heating and accelerating the fluid passing through respective slots 113 and 114, thus enhancing the well known stall improvement characteristics of the configuration and providing additional lift and thrust.

Figure 12:
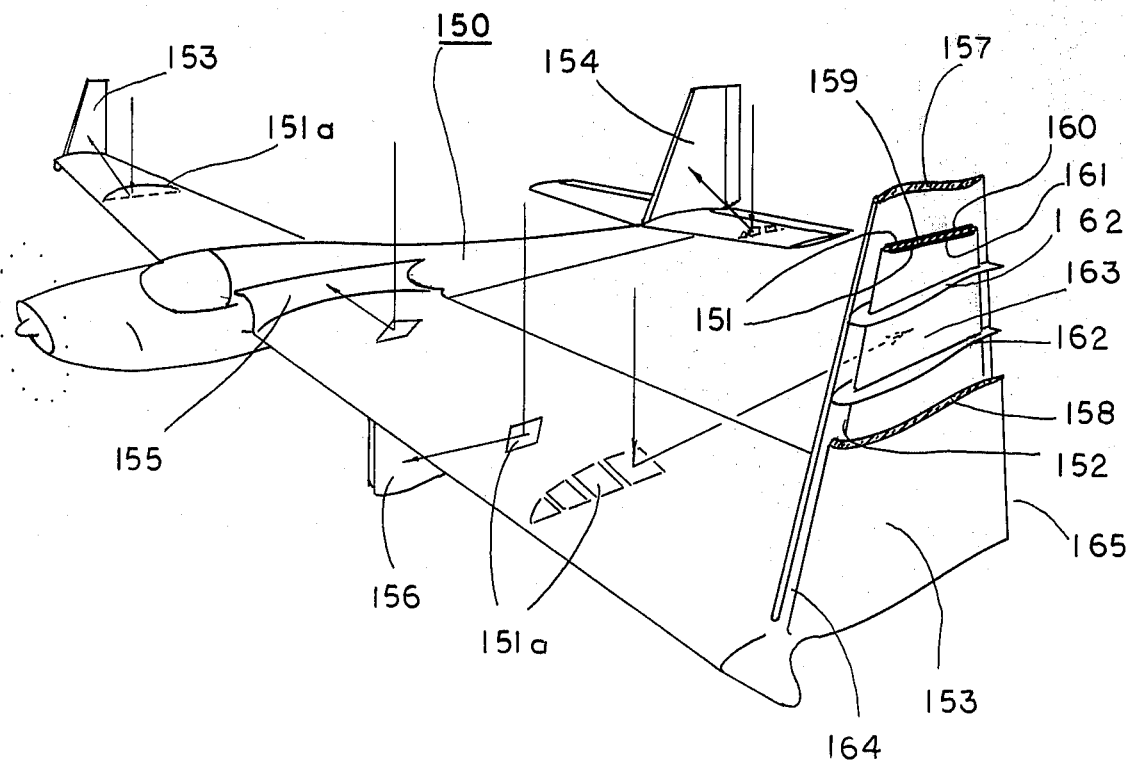
FIG. 12 is an oblique view of an aircraft in accordance with the present invention utilizing reflector means for focusing and thereby concentrating solar radiation onto further surfaces of the aircraft.

FIG. 12 illustrates a motor-glider 150 which incorporates the present invention by use of concentrated form of solar radiation and in doing so employs a plurality of movably mounted reflectors 151a, being well known and controlled by suitable means (not shown). A suitable type of reflector is more fully disclosed in FIG. 13. Motor-glider 150 is of conventional construction except for having a totally transparent skin made from materials as previously discussed and accordingly well known.

Treated surfaces 151 are conveniently located in passageways 152 located in "Whitcomb winglets" 153 readily seen in FIG. 12, and well known. Attention is directed to the rudder assembly 154 wherein there are provided further treated surfaces for receiving solar radiation. Further passageways with respective treated surfaces are located in wing root area 155 of the fuselage, also the landing gear fairings 156. Reflectors 151a may comprise aluminized "MYLAR" (Trademark of Dupont) film tensioned on a light-weight frame, since no aerodynamic forces are present in the enclosure housing the reflectors, namely the chambers formed in the wings and stabilizer.

Referring to FIG. 12 and the detailed construction of passageways 152, they are seen to comprise a pair of transparent outer skins 157 and 158 and a central dividing member 159 made from aluminum sheeting treated on sides 160 and 161 to absorb solar radiation received through respective outer skins 157 and 158. Passageways 152 further include ribs 162 for securing skins 157, 158 and member 159 together. Ribs 162 also provide a guiding means for the fluid heated by treated surfaces 160 and 161. Skins 157 and 158 therefore define a chamber 163 which varies in width between the respective leading and trailing edges thereof 164 and 165 in order to allow expansion and acceleration of the heated fluid.

The other aforementioned treated areas of glider 150 are constructed similarly to that discussed in respect of passageways 152.

With regard to operation of the embodiment shown in FIG. 12, solar radiation is received by reflectors 151a and focused thereby onto, for example, treated surface 160 to heat fluid adjacent thereto in passageway 152. Additionally, solar radiation also strikes treated surface 161 directly to heat passageway 152.

The heated fluid expands and accelerates through trailing edge 165 guided in its movement by rib 162 to provide lift and thrust to glider 150. Once forward motion of glider 150 is attained, the operation will be characterized by forced convection.

While relatively high temperatures are obtained as a result of focusing the solar radiation onto a relatively small area, the functioning of this embodiment relies upon the availability of direct solar radiation.

Figure 13:
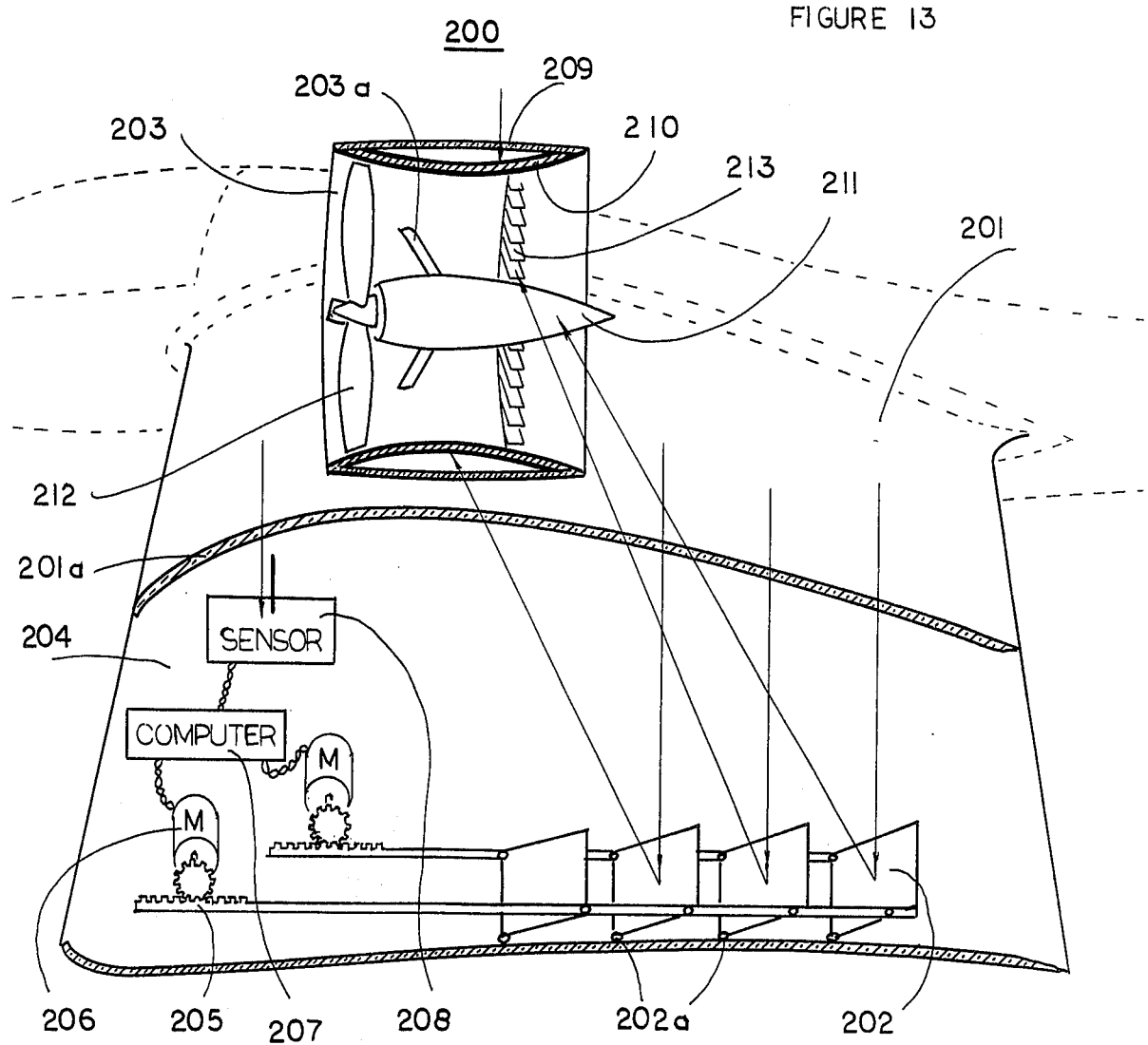
FIG. 13 is an oblique part sectional view of a ducted fan propulsion unit according to the present invention secured to a member shown in part section and which incorporates therein positioning means for reflector means in said member.

Reference is now made to FIG. 13 disclosing diagrammatically, a ducted fan propulsion unit 200 mounted upon an aircraft wing 201 comprising an airfoil having an upper transparent skin 201a housing a plurality of movably mounted reflectors 202 including controls therefor, reflector 202 being for use in directing solar radiation onto treated surfaces for absorbing solar radiation located within duct 203 of propulsion unit 200. Control of reflectors 202 is provided by control means 204 comprising rack and pinion arrangement 205 operated by motors 206 controlled by computer 207 activated by sensor 208, all being housed within wing 201.

Propulsion unit 200 includes a transparent outer skin 209 and metal inner skin 210 treated on both sides thereof to absorb solar radiation. Within duct 203 is rigidly mounted, via struts 203a, nacelle 211 housing motor (not shown) having a propeller 212. Nacelle 211 and propeller 212 have their outer surfaces treated to absorb solar radiation. A grill 213 comprises a plurality of surfaces treated for absorbing solar radiation and is secured within duct 203 by suitable means. Reflectors 202 are journalled for pivotal movement about points 202a.

With respect to the operation of the embodiment disclosed in FIG. 13, when solar radiation enters through transparent upper skin 201a and strikes sensor 208, the direction of the incoming radiation is discerned and this information, in form of signals, is relayed to computer 207 programmed to translate the signals into commands for motors 206. Motors 206 which through rack and pinion arrangement 205, rotate reflectors 202 about pivot points 202a in such a manner as to direct the incoming solar radiation onto the treated surfaces for absorbing solar radiation in propulsion unit 200. Fluid flowing through duct 203, for example, accelerated by propeller 202 is thus heated and expanded and therefore further accelerated increasing particularly thrust of the propulsion unit. Sensor 208, computer 207 and related accessories may be of any suitable commercially available type. Alternatively, although not disclosed, it is envisaged handling of the solar radiation onto the treated surfaces could be accomplished by other means including manually operated means.

Figure 14:
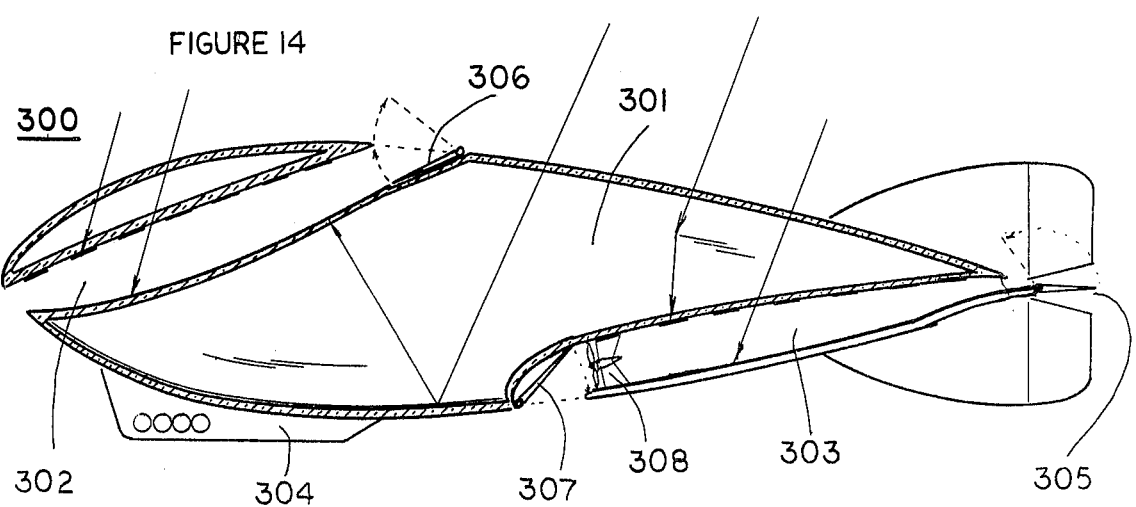
FIG. 14 is a sectioned elevational view of a lighter than air vehicle in accordance with the present invention.

Referring now to the embodiment of FIG. 14, there is disclosed a lighter than air vehicle 300 of the Zeppelin or the blimp type comprising a main envelope or airfoil 301 having a pair of passageways 302 and 303. Vehicle 300 further includes an operator's station 304 suspended therefrom and aerodynamic control 305. Envelope 301 is constructed substantially of transparent material affording ready transmission of solar radiation through the outer skin thereof.

Vehicle 300 is constructed in accordance with known designs using well known materials and methods, except as described hereinafter. Passageways 302 and 303 are in accordance with ones previously disclosed and described including being preferably circular or oval in cross-section having portions treated for absorbing solar radiation. However, it is to be noted passageways 302 and 303 are equipped with respectively fluid flow control means 306 and 307, flow control means 306 being located adjacent the outlet end of passageway 302 and flow control means 307 being located adjacent the inlet end of passageway 303. As further noted, passageway 303 houses a propulsion unit 308 of suitable well known means.

The inner bottom surface of envelope 301 not forming passageway 303, is treated with a reflective coating for use in redirecting solar radiation received into the envelope 301 onto treated surfaces in passageway 302 and 303.

Referring now to the operation of the embodiment shown in FIG. 14, solar radiation passing through the transparent skins of envelope 301 strikes directly or indirectly treated portions in passageways 302 and 303 to heat fluid therein. The heated fluid expands and accelerates upwardly toward the outlet ends of passageways 302 and 303, aided in the case of passageway 303 by the action of propulsion unit 308, thus producing substantial thrust and lift to vehicle 300. Through manipulation of the aerodynamic controls 305 of the vehicle 300 and flow control means 306 and 307, the direction and strength of thrust provided, can be controlled and also reversed, if desired.

Flow control means 306 and 307 also serve to provide clean aerodynamic shape of vehicle of closing off respective apertures when solar propulsion means are not in use.

With respect to the various embodiments disclosed, it is visualized solar radiation shading devices devices may be incorporated therein for protecting and controlling the devices and personnel operating the same.

I claim:

1. A method of providing acceleration and propulsion of a vehicle in an environment having at least some fluid, said vehicle having at least one member, at least a lower surface portion of which is treated for absorbing solar radiation for heating fluid adjacent the exterior of said member for use in propelling said vehicle through said environment, in the improvement comprising the steps of:
   (a) exposing said treated portion to solar radiation and intentionally heating fluid adjacent the exterior of said member thereby increasing the pressure and volume of said external fluid; and
   (b) exciting and thereby accelerating said heated fluid away from said lower surface portion in a manner to provide thrust and lift to said vehicle and accordingly providing propulsion of the vehicle, the acceleration of said fluid including allowing said heated and accordingly buoyant fluid to rise and accelerate against said member while deflecting said rising fluid in a direction so as to enhance said propulsion including the step of purposely allowing a flow of further external fluid to be heated.

2. In a vehicle having at least one member for use as an airfoil, said airfoil having respective leading and trailing edges and having at least one chamber having at least one upper and one lower skin, at least one of said skins being transparent so as to admit solar radiation therethrough onto said other skin, the improvement comprising:
   a treatment for absorbing solar radiation being applied to said other skin whereby when said airfoil is secured to said vehicle in a selected manner and upon absorption of solar energy by said treated skin, the fluid adjacent to and exteriorly of said lower airfoil skin is more greatly heated than the exterior air adjacent the upper airfoil skin and expanded to react against said skin to thereby provide lift to said vehicle.

3. In a vehicle as defined in claim 2 wherein there is at least one further transparent skin secured intermediate said pair of skins thereby to provide at least a pair of chambers of dead air space to thereby insulate and prevent convection losses when solar radiation is being admitted through said further transparent skin onto said treated skin.

4. In a vehicle as defined in claim 3 wherein said chamber adjacent said treated skin includes at least one aperture adjacent said leading edge and at least one aperture adjacent said trailing edge permitting the passage of fluid through said chamber in a manner to enhance said propulsion of said vehicle.

5. In a vehicle as defined in claim 4 wherein the volume of said chamber diminishes progressively toward said respective leading and trailing edges.

6. In a vehicle as defined in claim 4 wherein said aperture in said trailing edge is positioned and equipped with means to influence the vortex sheet, to thereby minimize induced drag during flight.

7. In a vehicle as defined in claim 4 wherein said member has an anhedral configuration for moving solar heated fluid in a spanwise direction relative to the pitch axis of said vehicle and fluid deflection means for deflecting the heated fluid in a direction opposite to the direction of travel of the vehicle.

8. In a vehicle as defined in claim 4 wherein said member has a dihedral configuration relative to the pitch axis of said vehicle and fluid deflection means for deflecting the heated fluid in a direction opposite to the direction of travel of the vehicle.

9. In a vehicle as defined in claim 4 wherein said member includes an anhedral and a dihedral configuration relative to the pitch axis of said vehicle and fluid deflection means for deflecting the heated fluid in direction opposite to the direction of travel of the vehicle.

10. In a vehicle as defined in claim 4 wherein an additional skin is provided in said chamber having solar radiation absorbing treatment thereon.

11. In a vehicle as defined in claim 10 wherein said additional skin is at least part treated, permitting solar radiation to pass through non-treated portions thereof so as to be received by said other treated skin.

12. In a vehicle as defined in claim 11 wherein said non-treated portions comprise apertures, thus permitting the solar radiation to pass through said apertures and to be received by said other treated skin.

13. In a vehicle as defined in claim 10 wherein at least one of said treated skins comprises heat insulating material.

14. In a vehicle having at least one member for use as an airfoil, said airfoil having respective leading and trailing edges and at least one chamber having at least one upper and one lower skin, at least one of said skins being transparent so as to admit solar radiation therethrough onto said other skin, the improvement comprising:
providing at least one recess in at least one of said skins, said recess opening toward said trailing edge, a portion of said recess having solar radiation absorbing treatment therein, said recess being for use in diverting fluid passing adjacent said skin, thereby to provide lift and thrust to said vehicle.

15. In a vehicle as defined in claim 14 wherein said recess includes at least one aperture facing toward said leading edge to permit induction of fluid into said recess.

16. A vehicle having at least one transparent skin, said vehicle including at least one member having at least one transparent skin and defining an enclosure, the improvement comprising:
at least one selectively positionable reflector in said enclosure for use in focusing solar radiation received through said transparent skin of said member, into at least one further portion of the vehicle having said transparent skin and directing onto a solar radiation absorbing portion for use in heating fluid, when solar radiation is applied to said absorbing portion, and acceleration means for accelerating said heated fluid for use in providing lift and thrust to the vehicle.

17. In a vehicle as defined in claim 16 wherein said further portion includes a plurality of solar radiation absorbing surfaces.

18. In a vehicle as defined in claim 16 including means for selectively positioning said reflectors comprising:
a sensor for use in determining the direction of the received solar radiation, means for converting the signal from the sensor into further signals for use in activating motor means, which through linkage, will properly position said reflectors for focusing the solar radiation onto said absorber portions.

19. A vehicle comprising an airfoil having a top external surface and a bottom external surface, the bottom surface lying substantially in a horizontal plane during operation of the vehicle, said air foil being treated to absorb solar energey for substantially more heating of said bottom surface and external air disposed adjacent thereto as compared to air adjacent and external to said top surface whereby fluid particles located without said airfoil are accelerated away from said bottom surface and fluid also located without said airfoil adjacent said bottom surface is expended and exerts a buoyant upward force on said airfoil, thus creating forces for lift to said vehicle.

20. A vehicle as defined in claim 19 wherein said heated bottom surface is selectively positioned in an inclined plane to said horizontal plane, thus to deflect said fluid particles and fluid thereby providing a horizontal force component on said vehicle.

21. A vehicle as defined in claim 19 or 20, wherein the top and bottom surfaces of the airfoil are interconnected to provide a substantially unbroken single outer surface about the airfoil.

22. A vehicle as defined in claim 19 wherein said airfoil has respective leading and trailing edges and said airfoil includes a concave lower surface and a convex upper surface.

* * * * *